United States Patent
Qin et al.

(10) Patent No.: US 9,434,874 B2
(45) Date of Patent: Sep. 6, 2016

(54) HYDROPHOBIC PROPPANT AND PREPARATION METHOD THEREOF

(75) Inventors: Shengyi Qin, Beijing (CN); Baoling Hu, Beijing (CN)

(73) Assignee: BEIJING RECHSAND SAND INDUSTRY SCIENCE & TECHNOLOGY CO., LTD., Beijing (CN)

( * ) Notice: Subject to any disclaimer, the term of this patent is extended or adjusted under 35 U.S.C. 154(b) by 416 days.

(21) Appl. No.: 13/877,243

(22) PCT Filed: Sep. 14, 2011

(86) PCT No.: PCT/CN2011/001558
§ 371 (c)(1),
(2), (4) Date: Apr. 1, 2013

(87) PCT Pub. No.: WO2012/041004
PCT Pub. Date: Apr. 5, 2012

(65) Prior Publication Data
US 2013/0225458 A1    Aug. 29, 2013

(30) Foreign Application Priority Data
Sep. 30, 2010   (CN) .......................... 2010 1 0500399

(51) Int. Cl.
*C09K 8/80*         (2006.01)
*C09K 8/62*         (2006.01)

(52) U.S. Cl.
CPC *C09K 8/805* (2013.01); *C09K 8/62* (2013.01)

(58) Field of Classification Search
None
See application file for complete search history.

(56) References Cited

U.S. PATENT DOCUMENTS

| | | | |
|---|---|---|---|
| 2005/0244641 A1* | 11/2005 | Vincent | C09K 8/62 428/403 |
| 2006/0177661 A1* | 8/2006 | Smith | C04B 18/082 428/403 |
| 2007/0036977 A1 | 2/2007 | Sinclair et al. | |
| 2007/0079965 A1 | 4/2007 | Nguyen et al. | |
| 2007/0289781 A1* | 12/2007 | Rickman | C09K 8/68 175/65 |
| 2008/0230223 A1 | 9/2008 | McCrary et al. | |
| 2008/0283243 A1 | 11/2008 | Rediger et al. | |
| 2009/0298720 A1* | 12/2009 | Nguyen | C09K 8/74 507/204 |

FOREIGN PATENT DOCUMENTS

| | | |
|---|---|---|
| CN | 101531893 A | 9/2009 |
| CN | 101768431 A | 7/2010 |
| JP | 2007-532721 A | 11/2007 |
| WO | 2005/100007 A2 | 10/2005 |
| WO | 2006/034298 A2 | 3/2006 |
| WO | WO 2008070704 A1 * 6/2008 ........... C04B 35/628 |
| WO | WO 2009/129025 A1 | 10/2009 |

OTHER PUBLICATIONS

Dec. 16, 2014 First Office Action issued in Chinese Application No. 201010500399.1.
Apr. 15, 2015 Second Office Action issued in Chinese Application No. 201010500399.1.
May 20, 2014 Extended European Search Report issued in European Application No. 11827902.5.
Mar. 25, 2014 Office Action issued in Russian Application No. 2013119445.
Aug. 6, 2015 Third Chinese Office Action issued in Chinese Application No. 201010500399.1.
Dec. 16, 2015 Fourth Chinese Office Action issued in Chinese Application No. 201010500399.1.
Jul. 15, 2015 Office Action issued in European Application No. 11 827 902.5.
Jul. 28, 2015 Notice of Reasons for Rejection issued in Japanese Application No. 2013-530527.

* cited by examiner

*Primary Examiner* — John J Figueroa
(74) *Attorney, Agent, or Firm* — Oliff PLC

(57) ABSTRACT

The invention discloses a hydrophobic proppant and a preparation method thereof. The aggregate particles of the hydrophobic proppant are coated with a coating resin which comprises a hydrophobic resin and nano-particles which are uniformly distributed in the coating resin and constitute 5-60% of the coating resin by weight. The contact angle labeled as θ between water and the hydrophobic proppant in which nano-particles are added is in the range of $120° \leq \theta \leq 180°$. The proppant of the present invention is prepared by adding the nano-particles in the existing resin in which low-surface-energy substances with hydrophobic groups are added, and a rough surface with a micro-nano structure is constructed on the outer surface of the prepared resin film, so that the contact angle θ at the solid-liquid contact surface on the outer surface of the coating resin of the proppant is more than 120°.

15 Claims, No Drawings

HYDROPHOBIC PROPPANT AND PREPARATION METHOD THEREOF

FIELD OF THE INVENTION

The invention relates to proppants for oil and gas wells in the field of exploration of oil fields, and specifically relates to a hydrophobic proppant and a preparation method thereof.

BACKGROUND OF THE INVENTION

A hydraulic fracturing technology is a main means for improving recovery ratio of low-permeability and ultralow-permeability oil and gas fields, and a proppant is solid particles used in oil hydraulic fracturing for supporting cracks so as to prevent re-closure of the cracks. During the fracturing process, the proppant serves as a medium for supporting the cracks to provide a conduction channel for extracting oil and gas, therefore the selection of the proppant is crucial for increasing the yield of the oil and gas fields. At present, proppants widely used at home and abroad mainly comprise natural quartz sand, sintered ceramsite and resin-coated proppants.

The quartz sand generally refers to natural silica sand and is mainly applied to fracturing operation of shallow low-closure pressure wells, and the shape of the quartz sand is similar to a spherical shape, so that the quartz sand has a certain fluidity, relatively low strength and poor anti-breaking capability. The sintered ceramsite is mostly obtained by high-temperature calcination (1380-1420° C.) of bauxite, oxides of silicon and other ore, and is mainly used for a middle-deep well fracturing process, but the ceramsite proppant has the shortcomings of great energy consumption, limited resources, high cost, large density and the like. The two proppants produce a large quantity of fragments and fine mealy sand during the using process due to the need of bearing greater impact force and closure pressure, and the fragments and fine mealy sand will block the cracks and further reduce the diversion capability of the cracks. Therefore the two proppants can not meet the increasing technical requirements of the fracturing process.

The resin-coated proppant is generally prepared by coating epoxy resin, phenolic resin, furan resin or combination thereof, serving as a binding agent, on the surface of quartz sand, ceramsite or walnut shell. Resin-coated proppants with different functions can be obtained by modifying the binding agent. The selective oil-permeable and water-resistant proppant is prepared by introducing a hydrophobic group with low surface energy into the molecular chain of a resin through a chemical method, making the obtained resin film have a better hydrophobicity and further improving the water-resistant performance of the proppant, therefore obtaining a functional proppant with the oil-permeable and water-resistant performance.

CN101531893A provides a functional pre-cured resin-coated proppant, which is prepared by adding an organic silicon compound with an active group and a hydrophobic group to react with a resin during the coating and curing process of the resin. During this process, the molecules of the organic silicon compound is connected to the cross-linked network of a resin film, and the hydrophobic group of the organic silicon compound which belongs to a low-surface-energy substance is coated on the surface of the resin, so that the contact angle θ formed when the solid phase contacts a liquid phase on the surface thereof is more than 90°, forming a hydrophobic structure, therefore the surface of the resin-coated proppant has hydrophobic and oleophilic properties, which improve the separation effect of oil and gas from water and reduce the oil extraction cost; and simultaneously, the proppant has better water resistance due to good hydrophobicity of the resin film, the anti-breaking capability of the proppant is improved, and the diversion effect is better. However, the hydrophobic proppant in the prior art still has some disadvantages. Although low surface energy materials such as organic silicon compounds are added to modify the resin so as to improve the water-resistant effect of the hydrophobic proppant, but the outer surface of the resin film is smooth, and generally when low surface energy materials are used to modify the surface of a smooth solid, the maximum water contact angle is only 120°, therefore when the hydrophobic proppant is used for the fracturing process of a middle-deep well oil layer or an oil layer with high displacement pressure, the solid phase-liquid phase contact angle on the outer surface of the proppant is possibly lager than 120°, which will greatly reduce the water-resistant effect of the proppant, or even make the proppant lose the water-resistant effect, so the application working conditions of the proppant in the prior art are limited. Therefore, in order to improve the water-resistant effect of the oil-permeable and water-resistant proppant and make the oil-permeable and water-resistant proppant applicable to various working conditions of the fracturing process, the structure of the coating material needs to be improved.

SUMMARY OF THE INVENTION

The present invention aims at solving the technical problems that the water-resistant effect of the proppant in the prior art is reduced and the applicable working conditions are limited due to the smooth structure of the outer surface of a resin film of a resin-coated proppant, and thus provides a hydrophobic proppant by constructing a micro-nano structure on the surface of a hydrophobic resin.

In order to realize the above mentioned goal, the present invention provides a hydrophobic proppant, comprising aggregate particles, and a coating resin cured on the surface of the aggregate particles;

the coating resin comprising a hydrophobic resin, and nanoparticles which are uniformly distributed in the hydrophobic resin;

the nano-particles constituting 5-60% of the coating resin by weight; and the weight ratio of the aggregate particles to the coating resin being 60-95:3-30.

The nano-particles are selected from the group consisting of nano-silicon dioxide, nano-aluminum oxide, nano-zinc oxide, nano-calcium carbonate, and mixtures thereof.

The nano-particles have a particle size in the range of 50 nm-150 nm.

The hydrophobic proppant further comprising a silane coupling agent, and the weight ratio of the silane coupling agent to the coating resin being 0.1-1:100.

The hydrophobic resin is obtained by modifying a resin with an organic silicon compound or a fluorine-containing compound, and the side chain of the organic silicon compound and the fluorine-containing compound being a hydrophobic group.

The organic silicon compound is selected from the group consisting of tricarboxylic polydiphenylsiloxane, α,ω-dihydroxy polydimethylsiloxane, triamino polydimethylsiloxane, polysiloxane triol, tricarboxylic polydimethylsiloxane, tricarboxylic silyloxy-methylsilasesquioxane, or mixtures thereof; and the fluorine-containing compound is tetrafluoroethylene, vinylidene fluoride, chlorotrifluoroethylene, fluorocarboxylic acid, and mixtures thereof.

The hydrophobic group of the side chain has a structural formula as follows:

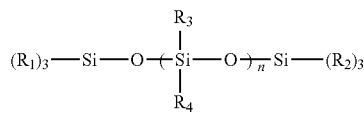

wherein R1 and R2 are selected from the group consisting of amino, hydroxy, carboxy and alkoxy; R3 and R4 are selected from the group consisting of alkyl and aryl; and n is an integer in the range of 4-200.

The silane coupling agent is selected from the group consisting of γ-aminopropyltriethoxysilane, γ-(2,3-glycidoxy) propyl trimethoxysilane, γ-(methacryloyloxy) propyl trimethoxysilane (KH570), N-β-(aminoethyl)-γ-aminopropyl trimethoxysilane, vinyl tris(β-methoxyethoxy) silane, and mixtures thereof.

The present invention also provides a preparation method of the hydrophobic proppant, comprising the following steps:

1) heating a hydrophobic resin to a molten state, adding nano-particles, stirring and cooling to room temperature, obtaining a coating resin comprising the nano-particles which are uniformly distributed in the hydrophobic resin;

2) heating aggregate particles, adding the coating resin prepared in step 1) and a silane coupling agent, and stirring for 10-60 seconds to uniformly coat the coating resin onto the surface of the aggregate particles; and 3) curing the coating resin.

In step (3), curing the coating resin by adding a curing agent.

The curing agent is selected from the group consisting of paraformaldehyde, hexamethylene tetramine, aliphatic amine, tertiary amine and salts thereof, aromatic amine and modified products thereof, imidazole, macromolecule prepolymer, acyl peroxide, peroxyester, and mixtures thereof; and the weight ratio of the curing agent to the coating resin is 1-20:100.

The preparation method of the hydrophobic proppant further comprising the following step after step (3):

4) adding a lubricating agent, stirring uniformly, cooling and screening.

The lubricating agent is selected from the group consisting of polyethylene wax, oxidized polyethylene wax, stearic amide, calcium stearate, and mixtures thereof; and the weight ratio of the lubricating agent to the coating resin is 0.5-1.5:100.

In step (1), the stirring is performed for 30 min under 8000r.

In step (2), heating the aggregate particles to 200-220° C.

The hydrophobic proppant of the present invention has the following advantages:

by constructing a rough surface with a nano structure, namely the micro-nano structure, on the surface of the existing hydrophobic resin, the actual solid phase-liquid phase contact surface is larger than the area observed apparently and geometrically. When the surface of the hydrophobic proppant prepared according to the invention meets water, some air is sealed between the water and the surface of the proppant, so that most of the water beads are in contact with the air, and the area directly contacting with the proppant is greatly reduced. Water droplets are nearly spherical on the rough surface due to the action of the surface tension of water, and the contact angle θ is increased, so that the water beads can freely roll on the surface, the hydrophobicity of the resin film is greatly enhanced, and the water resistance of the coated proppant is greatly enhanced. The contact angle labelled as θ between the hydrophobic proppant of the present invention and the water is in the range of $120° \leq \theta \leq 180°$, so the hydrophobic effect is greatly enhanced, and the applicable working conditions are wider.

DETAILED DESCRIPTION OF THE EMBODIMENTS

Epoxy resin, furan resin and phenolic resin used in embodiments 1-6 are commercially available products.

Embodiment 1

Raw materials for preparing a hydrophobic proppant:
coating resin: 10 kg
quartz sand as aggregate particles: 200 kg
paraformaldehyde as a curing agent: 0.1 kg
γ-aminopropyltriethoxysilane as a silane coupling agent: 0.1 kg
polyethylene wax as a lubricating agent: 0.05 kg
wherein the coating resin comprises a hydrophobic resin and nano-particles, the nano-particles constitute 50% of the coating resin by weight, and the hydrophobic resin constitutes 50% of the coating resin by weight;
nano-silicon dioxide is selected as the nano-particles, and the particle size is 50-150 nm; and
the hydrophobic resin is obtained by modifying epoxy resin with tricarboxylic polydiphenylsiloxane, and the modification method is as described in embodiment 1 disclosed in Chinese patent CN101531893A.

A method for preparing the hydrophobic proppant:
1) heating the hydrophobic resin to a molten state, adding the nano-particles, stirring for 30 min under 8000r and cooling to room temperature, obtaining a coating resin comprising the nano-particles which are uniformly distributed in the hydrophobic resin;
2) heating the aggregate particles to 200-220° C., adding the coating resin prepared in step 1) and a silane coupling agent, and stirring for 10-60 seconds to uniformly disperse the coating resin on the surface of the aggregate particles;
3) adding a curing agent into the prepared mixture, mixing uniformly, and curing for 15-120 seconds; and
4) adding a lubricating agent into the cured mixture, stirring uniformly, cooling and screening to obtain the proppant.

Embodiment 2

Raw materials for preparing a hydrophobic proppant:
coating resin: 30 kg
ceramsite as aggregate particles: 950 kg
hexamethylene tetramine as a curing agent: 1.5 kg
γ-(2,3-glycidoxy) propyl trimethoxysilane as a silane coupling agent: 0.03 kg
oxidized polyethylene wax as a lubricating agent: 0.9 kg
wherein the coating resin comprises a hydrophobic resin and nano-particles, the nano-particles constitute 60% of the coating resin by weight, and the hydrophobic resin constitutes 40% of the coating resin by weight;
nano-aluminum oxide is selected as the nano-particles, and the particle size is 50-150 nm; and the hydrophobic resin is obtained by modifying an epoxy resin with α,ω-dihydroxy polydimethylsiloxane, and the modification method is as described in embodiment 1 disclosed in CN101531893A.

A method for preparing the hydrophobic proppant:

1) heating the hydrophobic resin to a molten state, adding the nano-particles, stirring for 30 min under 8000r and cooling to room temperature to obtain a coating resin comprising the nano-particles which are uniformly distributed in the hydrophobic resin;

2) heating the aggregate particles to 200-220° C., adding the coating resin prepared in step 1) and a silane coupling agent, and stirring for 10-60 seconds to uniformly disperse the coating resin on the surface of the aggregate particles;

3) adding a curing agent into the prepared mixture, mixing uniformly and curing for 15-120 seconds; and 4) adding a lubricating agent into the cured mixture, stirring uniformly, cooling and screening to obtain the proppant.

Embodiment 3

Raw materials for preparing a hydrophobic proppant:
coating resin: 20 kg
nutshell as aggregate particles: 40 kg
aliphatic amine as a curing agent: 4 kg
γ-(methacryloyloxy)propyl trimethoxysilane as a silane coupling agent: 0.06 kg
stearic amide as a lubricating agent: 0.5 kg
wherein the coating resin comprises a hydrophobic resin and nano-particles, the nano-particles constitute 20% of the coating resin by weight, and the hydrophobic resin constitutes 80% of the coating resin by weight;
nano-zinc oxide is selected as the nano-particles, and the particle size is 50-150 nm; and
the hydrophobic resin is obtained by modifying a furan resin with triamino polydimethylsiloxane, and the modification method is as described in embodiment 1 disclosed in CN101531893A.

A method for preparing the hydrophobic proppant:

1) heating the hydrophobic resin to a molten state, adding the nano-particles, stirring for 30 min under 8000r and cooling to room temperature to obtain a coating resin comprising the nano-particles which are uniformly distributed in the hydrophobic resin;

2) heating the aggregate particles to 200-220° C., adding the coating resin prepared in step 1) and the silane coupling agent, and stirring for 10-60 seconds to uniformly disperse the coating resin on the surface of the aggregate particles;

3) adding the curing agent into the prepared mixture, mixing uniformly and curing for 15-120 seconds; and 4) adding the lubricating agent into the cured mixture, stirring uniformly, cooling and screening to obtain the proppant.

Embodiment 4

Raw materials for preparing a hydrophobic proppant:
coating resin: 30 kg
glass beads as aggregate particles: 95 kg
aliphatic tertiary amine as a curing agent: 2.4 kg
N-β-(aminoethyl)-γ-aminopropyl trimethoxysilane as a silane coupling agent: 0.15 kg
calcium stearate as a lubricating agent: 0.3 kg
wherein the coating resin comprises a hydrophobic resin and nano-particles, the nano-particles constitute 5% of the coating resin by weight, and the hydrophobic resin constitutes 95% of the coating resin by weight;
nano-calcium carbonate is selected as the nano-particles, and the particle size is 50-150 nm; and
the hydrophobic resin is obtained by modifying a furan resin with polysiloxane trial, and the modification method is as described in embodiment 1 disclosed in CN101531893A.

A method for preparing the hydrophobic proppant:

1) heating the hydrophobic resin to a molten state, adding the nano-particles, stirring for 30 min under 8000r and cooling to room temperature to obtain a coating resin comprising the nano-particles which are uniformly distributed in the hydrophobic resin;

2) heating the aggregate particles to 200-220° C., adding the coating resin prepared in step 1) and the silane coupling agent, and stirring for 10-60 seconds to uniformly disperse the coating resin on the surface of the aggregate particles;

3) adding the curing agent into the prepared mixture, mixing uniformly and curing for 15-120 seconds; and 4) adding the lubricating agent into the cured mixture, stirring uniformly, cooling and screening to obtain the proppant.

Embodiment 5

Raw materials for preparing a hydrophobic proppant:
coating resin: 10 kg
quartz sand as aggregate particles: 75 kg
imidazole as a curing agent: 1.5 kg
vinyl tris(β-methoxyethoxy) silane as a silane coupling agent: 0.08 kg
polyethylene wax as a lubricating agent: 0.2 kg
wherein the coating resin comprises a hydrophobic resin and nano-particles, the nano-particles constitute 30% of the coating resin by weight, and the hydrophobic resin constitutes 70% of the coating resin by weight;
a mixture of nano-silicon dioxide and nano-aluminum oxide is selected as the nano-particles, and the particle size is 50-150 nm; and
the hydrophobic resin is obtained by modifying a phenolic resin with tricarboxylic polydimethylsiloxane, and the modification method is as described in embodiment 1 disclosed in CN101531893A.

A method for preparing the hydrophobic proppant:

1) heating the hydrophobic resin to a molten state, adding the nano-particles, stirring for 30 min under 8000r and cooling to room temperature to obtain a coating resin comprising the nano-particles which are uniformly distributed in the hydrophobic resin;

2) heating the aggregate particles to 200-220° C., adding the coating resin prepared in step 1) and the silane coupling agent, and stirring for 10-60 seconds to uniformly disperse the coating resin on the surface of the aggregate particles;

3) adding the curing agent into the prepared mixture, mixing uniformly and curing for 15-120 seconds; and 4) adding the lubricating agent into the cured mixture, stirring uniformly, cooling and screening to obtain the proppant.

Embodiment 6

Raw materials for preparing a hydrophobic proppant:
coating resin: 20 kg
aggregate particles: 85 kg
curing agent: 2.4 kg
silane coupling agent: 0.12 kg
lubricating agent: 0.3 kg wherein the coating resin comprises a hydrophobic resin and nano-particles, the nano-particles constitute 40% of the coating resin by weight, and the hydrophobic resin constitutes 60% of the coating resin by weight;

the nano-particles are selected from the group consisting of nano-silicon dioxide, nano-aluminum oxide, nano-zinc oxide, nano-calcium carbonate and mixtures thereof, and the particle size is 50-150 nm; and the hydrophobic resin is obtained by modifying a phenolic resin with tetrafluoroethylene, and the modification method is as described in embodiment 1 disclosed in CN101531893A.

The curing agent is selected from the group consisting of paraformaldehyde, hexamethylene tetramine, aliphatic amine, tertiary amine and salt thereof, aromatic amine and modified products thereof, imidazole, macromolecule prepolymer, acyl peroxide, peroxyester, and mixtures thereof.

The silane coupling agent is selected from the group consisting of γ-aminopropyltriethoxysilane, γ-(2,3-glycidoxy) propyl trimethoxysilane, γ-(methacryloyloxy) propyl trimethoxysilane, N-β-(aminoethyl)-γ-aminopropyl trimethoxysilane, vinyl tris(β-methoxyethoxy) silane, and mixtures thereof.

The lubricating agent is selected from the group consisting of polyethylene wax, oxidized polyethylene wax, stearic amide, calcium stearate, and mixtures thereof.

The aggregate particles are ceramsite.

A method for preparing the hydrophobic proppant:

1) heating the hydrophobic resin to a molten state, adding the nano-particles, stirring for 30 min under 8000r and cooling to room temperature to obtain a coating resin comprising the nano-particles which are uniformly distributed in the hydrophobic resin;

2) heating the aggregate particles to 200-220° C., adding the coating resin prepared in step 1) and the silane coupling agent, and stirring for 10-60 seconds to uniformly disperse the coating resin on the surface of the aggregate particles;

3) adding the curing agent into the prepared mixture, mixing uniformly and curing for 15-120 seconds; and 4) adding the lubricating agent into the cured mixture, stirring uniformly, cooling and screening to obtain the proppant.

Comparative Example 1

Raw materials for preparing a hydrophobic proppant:
coating resin: 10 kg
quartz sand as aggregate particles: 200 kg
paraformaldehyde as a curing agent: 0.1 kg
γ-aminopropyltriethoxysilane as a silane coupling agent: 0.1 kg
polyethylene wax as a lubricating agent: 0.05 kg
and the coating resin is a hydrophobic resin, the hydrophobic resin is obtained by modifying an epoxy resin with tricarboxylic polydiphenylsiloxane, and the modification method is as described in embodiment 1 disclosed in CN101531893A.

A method for preparing the hydrophobic proppant:

1) preparing the required hydrophobic resin;

2) beating the aggregate particles to 200-220° C., adding the hydrophobic resin prepared in step 1) and the silane coupling agent, and stirring for 10-60 seconds to uniformly disperse the hydrophobic resin on the surface of the aggregate particles;

3) adding the curing agent into the prepared mixture, mixing uniformly and curing for 15-120 seconds; and 4) adding the lubricating agent into the cured mixture, stirring uniformly, cooling and screening to obtain the proppant.

Comparative Example 2

Raw materials for preparing a hydrophobic proppant:
coating resin: 30 kg
glass beads as aggregate particles: 95 kg
aliphatic tertiary amine as a curing agent: 2.4 kg
N-β-(aminoethyl)-γ-aminopropyl trimethoxysilane as a silane coupling agent: 0.15 kg
calcium stearate as a lubricating agent: 0.3 kg
wherein the coating resin comprises a hydrophobic resin and nano-particles, the nano-particles constitute 1% of the coating resin by weight, and the hydrophobic resin constitutes 99% of the coating resin by weight;

nano-calcium carbonate is selected as the nano-particles, and the particle size is 50-150 nm; and the hydrophobic resin is obtained by modifying a furan resin with α,ω-dihydroxy polydimethylsiloxane, and the modification method is as described in embodiment 1 disclosed in CN101531893A.

A method for preparing the hydrophobic proppant:

1) heating the hydrophobic resin to a molten state, adding the nano-particles, stirring for 30 min under 8000r and cooling to room temperature to obtain a coating resin comprising the nano-particles which are uniformly distributed in the hydrophobic resin;

2) heating the aggregate particles to 200-220° C., adding the coating resin prepared in step 1) and the silane coupling agent, and stirring for 10-60 seconds to uniformly disperse the coating resin on the surface of the aggregate particles;

3) adding the curing agent into the prepared mixture, mixing uniformly and curing for 15-120 seconds; and 4) adding the lubricating agent into the cured mixture, stirring uniformly, cooling and screening to obtain the proppant.

Comparative Example 3

Raw materials for preparing a hydrophobic proppant:
coating resin: 30 kg
ceramsite as aggregate particles: 950 kg
hexamethylene tetramine as a curing agent: 1.5 kg
γ-(2,3-glycidoxy) propyl trimethoxysilane as a silane coupling agent: 0.03 kg
oxidized polyethylene wax as a lubricating agent: 0.9 kg
wherein the coating resin comprises a hydrophobic resin and nano-particles, the nano-particles constitute 70% of the coating resin by weight, and the hydrophobic resin constitutes 30% of the coating resin by weight;

nano-aluminum oxide is selected as the nano-particles, and the particle size is 50-150 nm; and the hydrophobic resin is obtained by modifying an epoxy resin with polysiloxane triol, and the modification method is as described in embodiment 1 disclosed in CN101531893A.

A method for preparing the hydrophobic proppant:

1) heating the hydrophobic resin to a molten state, adding the nano-particles, stirring for 30 min under 8000r and cooling to room temperature to obtain a coating resin comprising the nano-particles which are uniformly distributed in the hydrophobic resin;

2) heating the aggregate particles to 200-220° C., adding the coating resin prepared in step 1) and the silane coupling agent, and stirring for 10-60 seconds to uniformly disperse the coating resin on the surface of the aggregate particles;

3) adding the curing agent into the prepared mixture, mixing uniformly and curing for 15-120 seconds; and 4) adding the lubricating agent into the cured mixture, stirring uniformly, cooling and screening to obtain the proppant.

An OCA (optical channel analyzer) 15EC optical contact angle measuring device is used for measuring the contact angle of the hydrophobic proppants prepared in each of the embodiments and the comparative examples, and the results are compared and listed in the following table.

TABLE 1

Comparison of contact angles of hydrophobic proppants prepared by adding different contents of nano-particles

| No. | Content of Nano-particles (%) | Contact Angle θ (°) |
|---|---|---|
| Embodiment 1 | 50 | 140.2 |
| Embodiment 2 | 60 | 136.4 |
| Embodiment 3 | 20 | 132.1 |
| Embodiment 4 | 5 | 121.4 |
| Embodiment 5 | 30 | 141.5 |
| Embodiment 6 | 40 | 154.7 |
| Comparative Example 1 | 0 | 109.3 |
| Comparative Example 2 | 1 | 108.7 |
| Comparative Example 3 | 70 | 113.2 |

By comparison, it can be seen that when the nanoparticles constitute 5%-60% of the coating resin by weight, the prepared proppant has a contact angle of θ in the range of 120°≤θ≤180°, showing a stronger hydrophobic performance.

In addition to the above embodiments, the organic silicon compound can also adopt tricarboxylic silyloxy-methylsilasesquioxane; and the fluorine-containing compound also can be selected from the group consisting of vinylidene fluoride, chlorotrifluoroethylene, fluorocarboxylic acid, and mixtures thereof.

Obviously, the above embodiments are merely used for clearly describing the examples rather than limiting the scope of the invention. Those ordinary skilled in the art can also make changes or variations in other different forms on the basis of the above description. It is unnecessary to describe all the implementation ways herein. However, the obvious changes or variations derived from the invention still fall in the scope of protection of the present invention.

The invention claimed is:

1. A hydrophobic proppant, comprising:
    aggregate particles; and
    a coating resin cured on the surface of the aggregate particles, the coating resin comprising:
        a hydrophobic resin, and
        nanoparticles uniformly distributed throughout the hydrophobic resin;
    wherein:
    the nanoparticles constitute 5 to 60% of the coating resin by weight;
    a weight ratio of the aggregate particles to the coating resin is 60-95:3-30; and
    the proppant has a contact angle of θ in the range of 120°≤θ≤180°.

2. The hydrophobic proppant of claim 1, wherein:
    the nanoparticles are selected from the group consisting of nano-silicon dioxide, nano-aluminum oxide, nano-zinc oxide, nano-calcium carbonate, and mixtures thereof.

3. The hydrophobic proppant of claim 1, wherein:
    the nanoparticles have a particle size in a range of 50 nm to 150 nm.

4. The hydrophobic proppant of claim 1, further comprising a silane coupling agent, wherein a weight ratio of the silane coupling agent to the coating resin is 0.1-1:100.

5. The hydrophobic proppant of claim 1, wherein:
    the hydrophobic resin is obtained by modifying a resin with an organic silicon compound or a fluorine-containing compound, and
    a side chain of the organic silicon compound or of the fluorine-containing compound is a hydrophobic group.

6. The hydrophobic proppant of claim 5, wherein:
    the organic silicon compound is selected from the group consisting of tricarboxylic polydiphenylsiloxane, α,ω-dihydroxy polydimethylsiloxane, triamino polydimethylsiloxane, polysiloxane triol, tricarboxylic polydimethylsiloxane, tricarboxylic silyloxy-methyl silasesquioxane, and mixtures thereof; and
    the fluorine-containing compound is selected from the group consisting of tetrafluoroethylene, vinylidene fluoride, chlorotrifluoroethylene, fluorocarboxylic acid, and mixtures thereof.

7. The hydrophobic proppant of claim 6, wherein:
    the hydrophobic group of the side chain has a structural formula as follows:

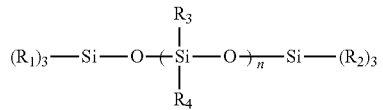

wherein:
    R1 and R2 are selected from the group consisting of amino, hydroxy, carboxy and alkoxy;
    R3 and R4 are selected from the group consisting of alkyl and aryl; and
    n is an integer in a range of 4 to 200.

8. The hydrophobic proppant of claim 4, wherein:
    the silane coupling agent is selected from the group consisting of γ-aminopropyltriethoxysilane, γ-(2,3-glycidoxy) propyl trimethoxysilane, γ-(methacryloyloxy) propyl trimethoxysilane, N-β-(aminoethyl)-γ-aminopropyl trimethoxysilane, vinyl tris(β-methoxyethoxy) silane, and mixtures thereof.

9. A preparation method of the hydrophobic proppant of claim 1, comprising the following steps:
    1) heating a hydrophobic resin to a molten state, adding nanoparticles, stirring and cooling to room temperature, obtaining a coating resin comprising the nanoparticles which are uniformly distributed in the hydrophobic resin;
    2) heating aggregate particles, adding the coating resin prepared in step 1) and a silane coupling agent, and stirring for 10 to 60 seconds to uniformly coat the coating resin onto surfaces of the aggregate particles; and
    3) curing the coating resin.

10. The preparation method of claim 9, wherein:
    in step 3), curing the coating resin comprises adding a curing agent to the coating resin.

11. The preparation method of claim 10, wherein:
    the curing agent is selected from the group consisting of paraformaldehyde, hexamethylene tetramine, aliphatic amine, tertiary amine and salts thereof, aromatic amine and modified products thereof, imidazole, macromolecule prepolymer, acyl peroxide, peroxyester, and mixtures thereof;
and a weight ratio of the curing agent to the coating resin is 1-20:100.

12. The preparation method of claim 9, further comprising the following step after step 3):
   4) adding a lubricating agent, stirring uniformly, cooling and screening.

13. The preparation method of claim 12, wherein:
the lubricating agent is selected from the group consisting of polyethylene wax, oxidized polyethylene wax, stearic amide, calcium stearate, and mixtures thereof; and
a weight ratio of the lubricating agent to the coating resin is 0.5-3:100.

14. The preparation method of claim 9, wherein:
in step 1), the stirring is performed for 30 minutes under 8000r.

15. The preparation method of claim 9, wherein:
in step 2), the aggregate particles are heated to a temperature in a range of 200 to 220° C.

* * * * *